Aug. 15, 1950     W. E. MERRIMAN     2,518,707
METHOD OF MAKING ELECTRICAL CONDENSERS
Filed Aug. 27, 1943     2 Sheets-Sheet 1
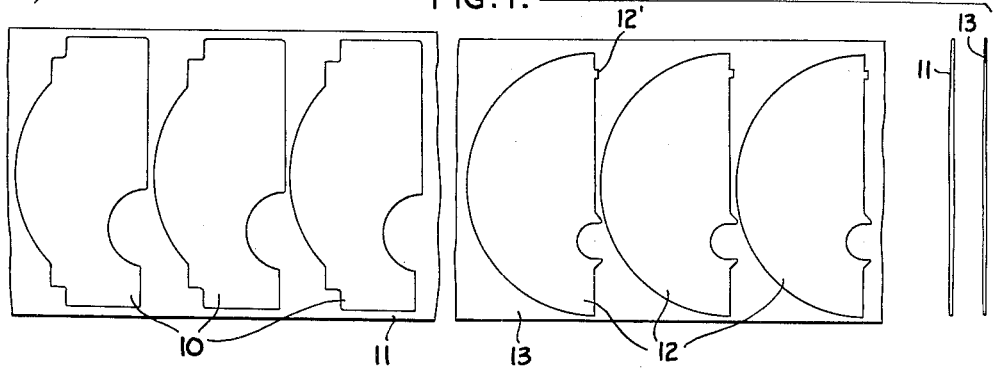
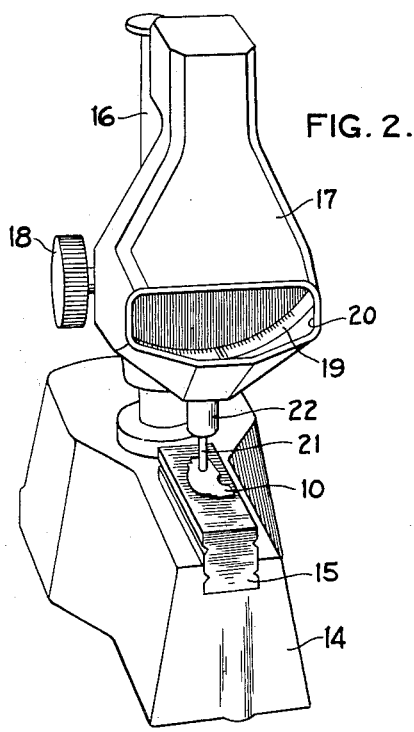
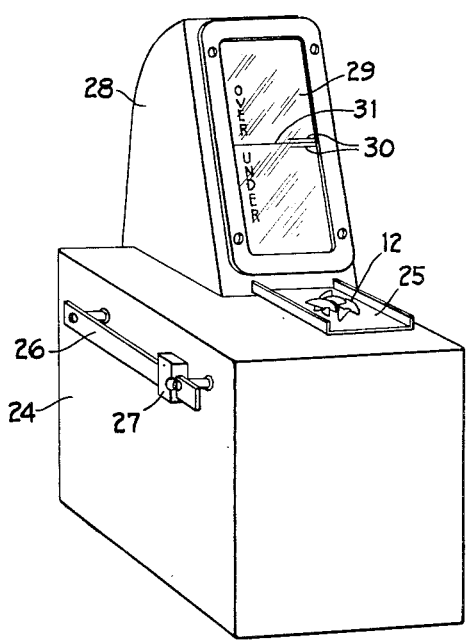
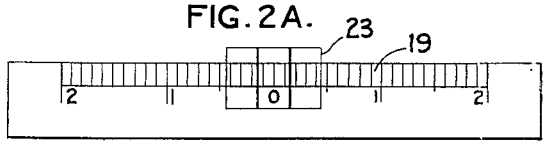
WILLIAM E. MERRIMAN
*INVENTOR*
BY
*ATTORNEYS*

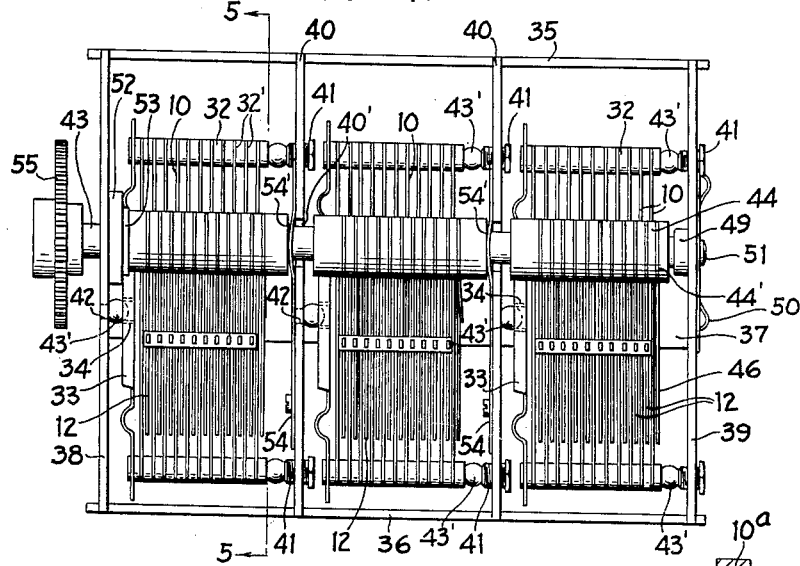
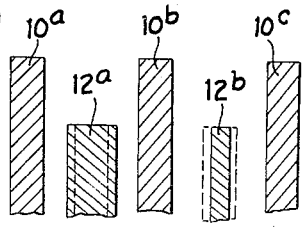
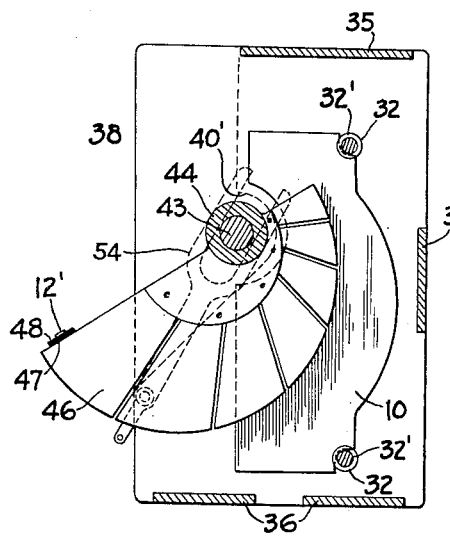
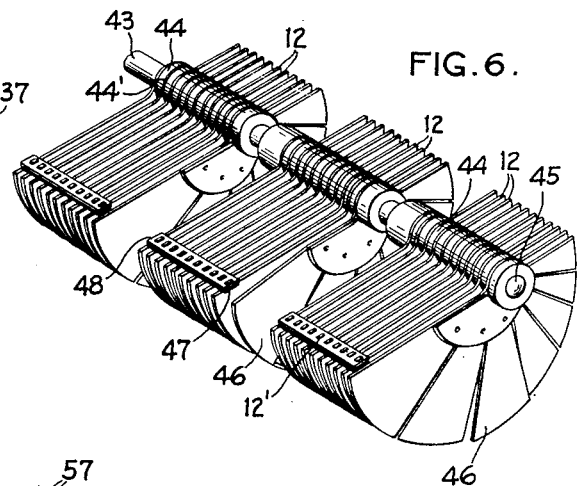
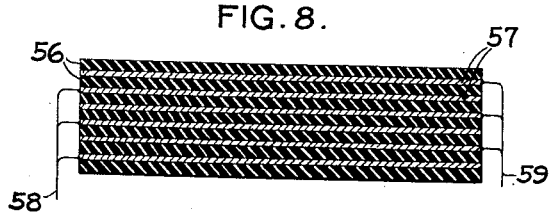
WILLIAM E. MERRIMAN
INVENTOR

Patented Aug. 15, 1950

2,518,707

UNITED STATES PATENT OFFICE 2,518,707

METHOD OF MAKING ELECTRICAL CONDENSERS

William E. Merriman, Rochester, N. Y., assignor to Eastman Kodak Company, Rochester, N. Y., a corporation of New Jersey Application August 27, 1943, Serial No. 500,268

5 Claims. (Cl. 73—432)

1

The present invention relates to a method of making an electrical condenser having a predetermined capacitance and more particularly to a method of averaging the thicknesses of condenser plates and/or dielectric plates so that the resulting condenser has said predetermined capacitance.

The method of the invention may be used in connection with variable or fixed condensers and/or in making electrical condensers having an air dielectric or dielectric plates between the condenser plates. The current trends in radio require very compact condensers of relatively high capacity and this in turn demands that the spacings between the condenser plates or thicknesses of the dielectric plates be of the same order as the thicknesses of the condenser plates. The method of the present invention and the following disclosure relate primarily to electrical condensers having an interplate spacing of the same order as the plate thickness. Under these circumstances, the thicknesses of the condenser or dielectric plates seriously affect the spacings between condenser plates and it is necessary to maintain the capacities of multiple plate condensers within narrow limits or small tolerances. The tolerances referred to herein are expressed in percentages or as the ratio of permissible deviation of an electrical capacity or plate thickness respectively to the total capacity or plate thickness.

It is a relatively simple matter for those skilled in the art to determine the required or standard interplate spacing and condenser plate thickness to produce a condenser of known capacity. Ordinarily, the sheet metal stock used for the condenser plates or the dielectric material used for the dielectric plates will vary in thickness from the predetermined plate thickness or plate spacing by several percent and will change the spacing between plates by the same amount so that the resultant capacity is altered by a percentage equal to the variation from the standard in the thicknesses of the materials used. When it is necessary to manufacture condensers with a capacity tolerance less than the percent variation in the thicknesses of the condenser or dielectric plates, the usual method is to sort the plates with an accurate thickness gauge and use only those plates which have thicknesses varying from the standard plate thickness only by the required tolerance or less. In practice, this limitation results in using only about 10 to 15% of the stock commercially provided and the remaining 85 to 90% of the stock can not ordinarily be used for

2 critical condensers having a small capacity tolerance, such as 1% or less.

The primary object of the present invention is a method of manufacturing an electrical condenser of a predetermined capacity which comprises averaging the plate thicknesses of the condenser and/or dielectric plates so that the average thickness of each equals the standard condenser plate thickness or standard dielectric plate thickness required to produce said capacity.

Another object of the invention is the aforementioned averaging of the thicknesses of condenser and/or dielectric plates by weighing said plates to ascertain that their average weight is equal within a given tolerance to the weight of a plate of standard thickness.

A further object of the invention is a classification of the plates as above or below the standard plate thickness which facilitates the averaging within a group of plates by substitution of classified plates until the average plate thickness is obtained.

Other and further objects of the invention will be suggested to those skilled in the art by the following description.

The above and other objects of the invention are embodied in a method of making an electrical condenser having a predetermined capacitance from a group of condensers and/or dielectric plates each of which may include one or more plates having a thickness differing from the standard plate thickness corresponding to the plate spacing required to produce said capacitance and which comprises averaging within a group of condenser or dielectric plates the thicknesses thereof so that the average thickness of the plates in each group equals the standard plate thickness. If the condenser capacity is required to be maintained within set limits or a predetermined tolerance, then the aforesaid averaging step must be performed to a corresponding accuracy. The averaging of the plate thicknesses within a group may be accomplished in any of several ways, but is most easily and effectively done merely by weighing the plates of a group, either collectively or individually, to ascertain that their average weight is equal to the weight of a standard plate. The classification of the plates as above or below standard thickness is an optional procedure but considerably simplifies the basically necessary step of averaging the plate thickness. Once the group of plates is averaged so that their average thickness equals the standard plate thickness, such plates may be mounted by known techniques and procedures to form the completed condenser which will have or can be adjusted, by known methods, to have the required capacity. Condensers composed of plates averaged or selected according to the present invention may be assembled in multiple gang units and will have, or can be adjusted to have, capacitances which are within very small tolerances and may be assembled into multiple gang variable unit condensers with each unit in all positions of the rotor having a capacitance equal within the tolerance to the capacitance of each of the other units. In actual practice the method of the invention has resulted in extraordinary savings both in material and time in the mass production of electrical condensers having capacitances within a tolerance of 1%.

Reference is hereby made to the accompanying drawings wherein similar reference characters designate similar elements and wherein:

Fig. 1 shows respectively plan and side views of sheet stock from which stator and rotor condenser plates have been stamped.

Fig. 2 is a perspective view of a thickness gauge of known design, Fig. 2-A is an enlarged plan view of the scale of such thickness gauge.

Fig. 3 is a perspective view of a weighing scales of standard design.

Fig. 4 is a front elevation of a variable condenser constructed from condenser plates averaged according to the invention.

Fig. 5 is a vertical section through such a variable condenser taken on the line 5—5 of Fig. 4.

Fig. 6 is a perspective view of the rotor for a multiple gang unit variable condenser and made from plates selected by the method of the invention.

Fig. 7 is a fragmentary vertical section through the plates of a variable condenser made according to the invention and illustrating the manner in which the spacing between plates is averaged by averaging of the plate thickness.

Fig. 8 is a vertical section through a fixed condenser including dielectric plates which have been selected according to the method of the invention.

The outstanding advantages of the present invention are best indicated by reference to a specific assembly. A common type of receiver tuning condenser is a three-gang unit variable condenser, each section having 11 stator plates and 10 rotor plates and having a capacity of 370 micro-microfarads. The total capacity of each condenser section must be maintained within 1% of the 370 micro-microfarads. As is usual in this type of variable condenser the plates have a thickness of 0.016" and the spacing between plates is also about 0.016". In order to maintain the capacity of the condenser sections within the required 1% tolerance it is necessary that the thickness of the plates or the spacing between plates shall not vary by more than plus or minus 0.00016".

The commercial plate used in this type of condenser is rolled sheet stock made preferably from Invar or from other suitable materials, such as aluminum, brass, steel, etc. and is obtainable commercially only to a thickness tolerance of plus or minus 0.0005" optimum. The sheet stock may be obtained in widths corresponding to the dimensions of the condenser plates and as shown in Fig. 1 condenser stator plates 10 are stamped from the sheet stock 11 and condenser rotor plates 12 are stamped from the sheet stock 13. The manner in which the sheet stocks 11 and 13 vary in thickness commercially is illustrated in the side views thereof in the right-hand portion of Fig. 1.

It has been found that sorting of the condenser plates, such as stator plates 10 and rotor plates 12 to discard all plates not having a thickness within the required tolerance of plus or minus 0.00016" will result in only 10 to 15% of the plates being usable for a condenser having a capacity within a tolerance of 1%. The essence of the present invention is a method of averaging the thicknesses of condenser or dielectric plates within a group and within the required tolerance so that sheet stock varying from the standard thickness by more than the predetermined tolerance can be used. For example, instead of rejecting 85 or 90% of the condenser plates stamped from commercial sheet metal stock having a thickness tolerance of plus or minus 0.0005" all of the plates stamped therefrom can be used if the plates in a group are averaged according to the invention.

That step of the invention for averaging the thicknesses of the condenser plates or dielectric plates within a group may be accomplished in any of several ways. For instance, some electric characteristic of the plates which is proportional to the thickness may be measured individually or collectively to obtain a group of plates of average thickness within the tolerance, a method of hydraulic displacement could be employed so to average the plate thickness. However, for reasons of simplicity and facility I prefer to effect the averaging of plate thicknesses by weighing because the step can then be carried out by readily available apparatus and the substitution of plates, one for the other until the average plate thicknesses are brought within the tolerance, can be easily performed. Nevertheless, it is to be understood that the invention is not limited to any particular method of averaging the plate thickness to within a fixed tolerance of the standard plate thickness.

The preferred form of the averaging of condenser and dielectric plate thicknesses, according to the invention, is to place all of the plates forming a group upon a weighing scales. Since the length, width and density of each plate are substantially uniform, the thickness of the plate is proportional to its weight. Likewise, the total weight of a group of plates divided by the number of plates in the group gives the average weight of each plate. The weight of a plate of standard thickness being known, when the average weight per plate is equal within the tolerance to the weight of a plate of standard thickness, the averaging requirement of the present invention is satisfied. It is a remote possibility or chance that the total weight of a group of plates will be equal within the tolerance to the weight of a plate of standard thickness times the number of plates in the group but even so the present method verifies or predetermines that the condenser to be made from those plates will have a capacity within the fixed tolerance. It is far more likely that the total weight of a group of plates will not equal within the tolerance the weight of a standard plate times the number of plates in a group, whereupon, according to the invention, substitution of one or more of the plates in the group is made until the total weight of the group is equal within the tolerance to the weight of a plate of standard thickness times the number of plates in a group.

Accessory to averaging of plate thicknesses according to the invention is classification of the plates prior to averaging. By such classification the operator will be able more intelligently to effect the substitution of plates and attain the average desired. For instance, the individual plates may be classified by use of a thickness gauge of any known form.

One such thickness gauge comprises a base 14 carrying a gauge block 15 and having upright 16. A head assembly 17 is adjusted to various positions on the upright 16 by loosening the knob 18 and includes a graduated scale 19 which may be observed through a window 20. Said head assembly 17 includes in a known manner a light beam and mirror, not shown, and a feeler rod 21 spring pressed through a bushing 22 toward the gauge block 15. Sail feeler rod 21 is arranged in a well recognized manner, not shown, to rotate the aforementioned mirror and alter the position of an illuminated slit or optical pointer with respect to the graduated scale 19. The graduated scale 19 has divisions each representing 0.0001" and may also have superimposed thereon a range scale 23 with its extremes at 0.00045" on each side of the "0" point of scale 19 and having a central range with its limits at 0.00015" on each side of the "0" point of scale 19. The condenser plate is moved through the thickness gauge, as shown, condenser stator plate 10 is moved longitudinally along the gauge block 15, and vertical movement of the feeler rod 21 with corresponding variations in thickness of the plate causes movement of the optical pointer along the graduated scale 19. If the optical pointer, as is generally the case, moves into the range plus or minus 0.00015" to 0.00045" the plate is known to be thick or thin, respectively, and is then placed by the operator with other thick or thin plates. The infrequency of a plate thickness being within the range plus or minus 0.00015" demonstrates the large percentage of plates that would have to be rejected if the method of the present invention were not to be used. If the optical pointer of the thickness gauge moves beyond the limits of range scale 23, the operator may note that the plate is not within the thickness tolerance specified. However, it has frequently been found that plates even exceeding the tolerance of plus or minus 0.0005" can be used and by virtue of the averaging step according to the invention the capacity of the resulting condenser is still within the required tolerance. The plates divided into a group of thick plates and a group of thin plates are ready for averaging.

According to the preferred form of the invention the averaging is accomplished on a weighing scales of commercial design. Such weighing scales comprises a base 24, a weighing platform 25, a weight arm 26 and weight 27 slidable thereon for calibration, and includes a housing 28 having a screen 29. Said screen 29 has two index marks 30 spaced and located at positions corresponding to the maximum and minimum tolerance of the total weight of the group of plates or tolerance permitted in the capacity of the finished condenser. An optical system within said weighing scales projects a line pointer 31 onto the screen 29 and which assumes a position corresponding to the weight of the plates on the weighing platform 25.

The operator performs the weighing step according to the invention by placing a group of plates on the weighing platform 25 and if the line pointer 31 takes a position between the index marks 30 it is then known that the total weight of the group of plates is equal within the tolerance to the weight of a plate of standard thickness times the number of plates in the group and consequently the average thickness of the plates in the group is equal within the tolerance to the thickness of a standard plate. If, as is generally the case, the pointer 31 is not between index marks 30 the operator substitutes another plate for one of the plates on platform 25 and continues such substitution until the line pointer 31 comes between the index marks 30. The previous classification of the plates into thick and thin groups facilitates the weighing step in two respects. First, the operator in placing a group of plates on the scales for the first time makes up the group out of half thick plates and half thin plates so that an average at least approaching the average thickness within the tolerance is immediately obtained. Second, when substitution of plates is required, and the pointer 31 is above the index marks 30 showing that the average plate thickness is too great, a thin plate may be substituted for a heavy plate so that the substitution will result in moving the average in the right direction. Conversely, if the total weight of the plates is such that the pointer 31 is under the index marks 30 then a heavy plate is substituted for a thin plate and this substitution is continued until the pointer 31 comes to rest between the index marks 30. A group of plates, either condenser plates or dielectric plates, so weighed has been averaged so that the average thickness of said plates is equal to the standard plate thickness required to produce a definite electric capacity within a stated tolerance and which tolerance has determined the accuracy of the averaging or weighing step of the method of the invention.

It is also within the scope of the invention to accomplishing the averaging of the plate thicknesses by weighing the plates individually. This more laborious procedure of only slightly greater accuracy requires that the weight of each plate be recorded. Then the plates of various weights sufficient to equal the known total weight are grouped and the plates within the group have an average thickness within the tolerances according to the invention. Another reason for preferring averaging by weighing a group of plates over individual weighing of the single plates as just described is that weighing the plates in a group distributes any weighing error over the several plates of the group.

The assembling of the condenser plates and/or dielectric plates into a complete condenser substantially follows known and standard practices. For instance, a group of condenser stator plates 10 having had their thickness averaged according to the invention, which group in the illustrated embodiment includes 11 plates, are supported in spaced relation in a soldering jig and are then soldered to a pair of stator spacers 32 which are each provided with 11 circumferential grooves 32', see Fig. 5, and internal recesses at each end. A support bracket 33 has each of its ends soldered to said stator spacers 32 and carries at its center a hollow bushing 34. The condenser frame comprises a top plate 35, bottom plates 36, back plate 37, end walls 38 and 39 and intermediate partitions 40. Mounting studs 41 are threaded into end wall 39 and intermediate partitions 40 and have internal recesses in the ends thereof. The end wall 38 and intermediate partitions 40 are provided with holes 42. The stator sections are mounted upon the condenser frame, preferably by balls 43' of non-conductive material, such as a synthetic resin and which partially extend into the recessed ends of stator spacers 32 and mounting studs 41 and into the hollow bushings 34 and holes 42. In this manner the stator sections are mounted upon but insulated from the condenser frame.

The groups of condenser rotor plates 12 are mounted upon a rotor shaft 43 which carries a plurality of rotor spacers 44 provided with circumferential grooves 44' and has a ballbearing 45 set into one end thereof, see Fig. 6. The several groups of condenser rotor plates 12, which have had their thickness averaged according to the invention, are placed in a suitable soldering jig along with a sectionalized calibrating plate 46. The condenser plates 12 and 46 are soldered to the grooves 44' in the rotor spacers 44 in a known manner. The spacing of the rotor condenser plates 12 is further maintained in standard fashion for which purpose said condenser rotor plates 12 are each provided with a lug 12'. An insulating strip 47 is perforated and placed over the lugs 12' and a spacing strip 48 is also perforated to receive lugs 12' and is soldered thereto while the rotor plates 12 are in the soldering jig. Said spacing strip 48 thus maintains the spacing of condenser rotor plates 12 and the insulating strip 47 acts as an insulating stop in a manner to be described.

The condenser rotor is mounted within the condenser frame in any suitable manner. As shown, the end of the rotor shaft carrying ballbearing 45 is supported by a ballbearing end bearing 49 mounted upon a spring member 50 which is fastened to end wall 39 by screws 51. The other end of rotor shaft 43 is supported by a ballbearing journal 52 mounted in end wall 38 and rotor shaft 43 carries a collar 53 which is spring pressed against the ballbearings in said journal 52. The intermediate partitions 40 are provided with recesses 40' to provide clearance for the rotor shaft 43 and spring members 54 having bifurcated ends and curved portions 54' are mounted on intermediate partitions 40. Said curved portions 54' of spring members 54 bear against the ends of rotor spacers 44 and along with spring member 50 produce an end thrust upon rotor shaft 43 so that collar 53 is resiliently held against the ballbearings of journal 52 and the condenser rotor plates 12 are accurately located within the spaces between the condenser stator plates 10. Rotation of the condenser rotor may be accomplished in any known way as by means of a gear 55 mounted upon the rotor shaft 43 beyond the end wall 38. Rotation of gear 55 and rotor shaft 43 will move the condenser rotor plates 12 with respect to the condenser stator plates 10 into any desired angular relation and the insulating strip 47 beneath the spacing strip 48 will abut against the edges of condenser stator plates 10 when the rotor is moved to its extreme position for maximum capacity, the insulating strip 47 preventing any short-circuits between the condenser plates 10 and 12 at this time.

The variable condenser so constructed from groups of condenser plates having averaged thicknesses within the predetermined tolerances of the standard thickness has all of its sections of the same electric capacity within said tolerance. Such variable condensers are calibrated by mounting upon a suitable instrument for measuring with extreme accuracy the capacity of each section. Practically absolute equalization of the capacity of the units for all positions of the rotor can now be obtained merely by appropriate bending of the sectors of the calibrating plates 46. Heretofore, it has been found extremely difficult to manufacture variable condensers which can be calibrated to the same accuracy in this manner, and on a mass production scale only a very small percentage of the condensers made without previous averaging of the plate thickness have been passable.

It is well understood that the capacity of a multiple plate condenser is proportional to the spacing between the plates or thickness of the dielectric. It is obviously not possible or practical to average the condenser plate spacing after the condenser has been assembled and this is particularly true in variable condensers where the plates are soldered onto spacers. The condenser plate thickness per se does not affect the electrical capacity of the condenser. Although the plate area is a factor in determining condenser capacity, for a known condenser such plate area is a constant. As a result, the plate spacing is the principal variable factor and is the complement of the plate thickness. Consequently, maintaining the total or average plate thickness within a set tolerance also maintains the plate spacing within that tolerance and since other factors affecting the electrical capacity are constant, the condenser capacity is maintained within the same tolerance as the plate thickness and complementary plate spacing.

The aforementioned result is illustrated in Fig. 7 showing fragmentary vertical sections of condenser plates for a condenser assumed to require plates of $\frac{1}{4}''$ thickness and $\frac{1}{4}''$ spacing. To simplify the illustration the plates 10a, 10b, and 10c are of the standard $\frac{1}{4}''$ thickness and are equally spaced. The plate 12a is shown to have a $\frac{3}{8}''$ thickness and the plate 12b to have a $\frac{1}{8}''$ thickness. The average thicknesses of plates 12a and 12b are the required $\frac{1}{4}''$ and the dotted lines associated with plates 12a and 12b indicate such average or standard thickness. The interplate spacings between plates 10a, 10b, and 10c and plates 12a and 12b are $\frac{3}{16}''$, plus $\frac{3}{16}''$, plus $\frac{5}{16}''$, plus $\frac{5}{16}''$, totaling one inch. If the plates 12a and 12b were of average thicknesses there would be four $\frac{1}{4}''$ spacings also equalling one inch. Hence, even though plates 12a and 12b differ from the standard plate thickness, since their average thickness is equal to the standard plate thickness, then the total interplate spacing or condenser capacity is the same as though the thick plate 12a and thin plate 12b were of the standard thickness.

The present invention is also applicable to the making of a fixed condenser having dielectric layers between the plates or foils thereof and required to have a predetermined electrical capacity produced by a standard plate spacing. The dielectric layers may be composed of mica, glass, cellulose derivatives, etc. and are blanked in the usual way into the shape required. The thicknesses of the dielectric layers to form a given condenser are then averaged according to the invention and will, when inserted between the plates or foils of the condenser, give the average plate spacing which will produce the desired electrical capacity. As in the case of condenser plates, the preferred method of averaging is by weighing the dielectric layers, either collectively or individually, and substituting dielectric layers if necessary, until a predetermined total weight of dielectric layers is obtained. Also, it is to be understood that other averaging methods may be used to average the thicknesses of the dielectric layers. The method of the invention is particularly advantageous in selecting dielectric layers of mica, which vary considerably in thicknesses. However, by the averaging method, according to the invention, which will be considerably simplified by the classification step previously described, a fixed mica condenser having a known capacity can readily be constructed and assembled. Since fixed condensers are often covered with thermoplastic composition, it is also difficult to disassemble and reconstruct them in order to obtain a predetermined capacity.

Fig. 8 shows a fixed condenser having dielectric layers 56 and interposed condenser plates 57, the alternate condenser plates 57 being connected respectively to leads 58 and 59. The dielectric layers 56 have, according to the invention, average thicknesses corresponding to the standard plate spacing required for the condenser capacity desired and if the condenser capacity must be maintained within a certain tolerance, the average and/or weighing of the dielectric layers 56 must be performed with an accuracy within that tolerance. Since fixed condensers are often made of conducting sheet material having a uniform thickness maintained with narrow limits, such as tin or aluminum foil, the averaging of the plate thicknesses may not be necessary. However, if the sheet material for the fixed condenser plates 57 varies in thickness by more than the tolerance permitted for the capacity of the condenser, then the condenser plates 57, as well as the dielectric layers 56, must be averaged according to the invention either by weighing or other suitable procedures. The condenser plates 57 of the fixed condenser all have the same shape and hence the group of all the plates may be averaged at once rather than separate averaging of the stator plates and rotor plates for a variable condenser.

Since other techniques for averaging the thicknesses of condenser plates or condenser dielectric layers may be used or devised, the present invention is not to be limited to the weighing method herein described. Also, the method of the invention may be used in whole or in part to produce electrical condensers of predetermined capacity and may be utilized when such electric capacity must be maintained within set limits or tolerances by conducting the averaging of the plate thickness within those limits or that tolerance. The present disclosure is to be construed in an illustrative sense and the scope of the invention is defined by the appended claims.

Having now particularly described my invention what I desire to secure by Letters Patent of the United States, and what I claim is:

1. In a method of making an electrical condenser having a predetermined capacitance from a group of condenser plates which may include one or more condenser plates having a thickness different from the standard plate thickness corresponding to the inter-plate spacing for producing said capacitance, which comprises counting out or grouping an established number of plates of the same outline, to be incorporated in the condenser, determining the average thickness of the plates of such group, and in the event the average thickness of such plates be above or below a set tolerance, substituting plates of a different thickness, as necessary, to bring their average thickness within said tolerance.

2. In a method of making an electrical condenser having a capacitance within a predetermined tolerance from a group of condenser plates which may include one or more condenser plates having a thickness differing by more than said tolerance from the standard plate thickness corresponding and substantially equal to the inter-plate spacing for providing said capacitance, which comprises counting out or grouping an established number of plates of the same outline, to be incorporated in the condenser, determining the average thickness of the plates of such group, and in the event the average thickness of such plates be above or below said predetermined tolerance, substituting plates of a different thickness, as necessary, to bring their average thickness within said predetermined tolerance.

3. In a method of making an electrical condenser having a capacitance within a predetermined tolerance from a group of condenser plates which may include one or more condenser plates having a thickness differing by more than said tolerance from the standard plate thickness corresponding and substantially equal to the inter-plate spacing for providing said capacitance, which comprises classifying the condenser plates, which may differ by more than said tolerance from said standard plate thickness, as above or below said standard plate thickness, counting out or grouping an established number of plates of the same outline in substantially equal numbers from plates classified as above and below said standard plate thickness, to be incorporated in the condenser, determining the average thickness of the plates of such group, and in the event the average thickness of such plates be above or below said predetermined tolerance, substituting plates of a different thickness, as necessary, to bring their average plate thickness within said predetermined tolerance.

4. In a method of making a two-part condenser assembly having a capacity within a predetermined tolerance and composed of condenser halves each having a plurality of condenser plates which may have thicknesses varying from a standard plate thickness by more than said tolerance, which comprises counting out or grouping an established number of plates of the same outline to be incorporated in one condenser half, determining the average thickness of the plates of such group, and in the event the average thickness of such plates be above or below said predetermined tolerance, substituting plates of a different thickness, as necessary, to bring their average thickness within said predetermined tolerance.

5. In a method of making an electrical condenser having a capacitance within a predetermined tolerance and including a group of dielectric plates which may include one or more plates having a thickness differing by more than said tolerance from a standard thickness equal to the standard plate spacing for providing said capacitance, which comprises counting out or grouping an established number of dielectric plates of the same outline, to be incorporated in the condenser, determining the average thickness of the plates of such group, and in the event the average thickness of such plates be above or below said predetermined tolerance, substituting plates of a different thickness, as necessary, to bring their average thickness within said predetermined tolerance.

WILLIAM E. MERRIMAN.

(References on following page)

REFERENCES CITED

The following references are of record in the file of this patent:

UNITED STATES PATENTS

| Number | Name | Date |
|---|---|---|
| 1,459,886 | Hammond | June 26, 1923 |
| 1,614,630 | Petin | Jan. 18, 1927 |
| 1,983,892 | Barton | Dec. 11, 1934 |
| 1,994,549 | Von Pein | Mar. 19, 1935 |
| 1,996,189 | Biro | Apr. 2, 1935 |
| 2,060,901 | Smith | Nov. 17, 1936 |
| 2,398,721 | Rogers | Apr. 16, 1946 |

FOREIGN PATENTS

| Number | Country | Date |
|---|---|---|
| 27,023 | Great Britain | Nov. 20, 1909 |
| 481,091 | Great Britain | Mar. 4, 1938 |